United States Patent [19]

(12) United States Patent
Kim et al.

(10) Patent No.: US 11,843,125 B2
(45) Date of Patent: Dec. 12, 2023

(54) POROUS COMPOSITE SEPARATOR FOR SECONDARY BATTERY, AND LITHIUM SECONDARY BATTERY COMPRISING SAME

(71) Applicants: SK Innovation Co., Ltd., Seoul (KR); SK IE Technology Co., Ltd., Seoul (KR)

(72) Inventors: Hye Jin Kim, Daejeon (KR); Yun Bong Kim, Daejeon (KR); Suji Lee, Daejeon (KR); Won Sub Kwack, Daejeon (KR); Kyu Young Cho, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 427 days.

(21) Appl. No.: 16/769,707

(22) PCT Filed: Dec. 4, 2018

(86) PCT No.: PCT/KR2018/015228
§ 371 (c)(1),
(2) Date: Jun. 4, 2020

(87) PCT Pub. No.: WO2019/112283
PCT Pub. Date: Jun. 13, 2019

(65) Prior Publication Data
US 2020/0373538 A1    Nov. 26, 2020

(30) Foreign Application Priority Data

Dec. 7, 2017    (KR) .................. 10-2017-0167299

(51) Int. Cl.
*H01M 50/446*    (2021.01)
*H01M 10/0525*    (2010.01)
(Continued)

(52) U.S. Cl.
CPC ..... *H01M 50/446* (2021.01); *H01M 10/0525* (2013.01); *H01M 50/40* (2021.01);
(Continued)

(58) Field of Classification Search
None
See application file for complete search history.

(56) References Cited

U.S. PATENT DOCUMENTS

2010/0316903 A1    12/2010  Kim et al.
2013/0101885 A1*    4/2013  Lee ..................... H01M 50/446
                                                                    427/372.2
(Continued)

FOREIGN PATENT DOCUMENTS

CN    1853292 A    10/2006
CN    105742638 A    7/2016
(Continued)

*Primary Examiner* — Haixia Zhang
(74) *Attorney, Agent, or Firm* — THE WEBB LAW FIRM (57) ABSTRACT

The present invention relates to: a porous composite separator for a secondary battery including a porous substrate, and a coating layer formed on the porous substrate, wherein the coating layer has a plurality of inorganic particles, which are connected and fixed by a composite binder including a particulate polymer binder and an interpenetrating polymer network (IPN)-type binder having no melting point and having a thermal decomposition temperature of 300° C. or higher; and a lithium secondary battery including the same.

15 Claims, 1 Drawing Sheet

(51) Int. Cl.
  *H01M 50/409* (2021.01)
  *H01M 50/40* (2021.01)
  *H01M 50/451* (2021.01)
  *H01M 50/491* (2021.01)
  *H01M 50/417* (2021.01)
  *H01M 50/42* (2021.01)
  *H01M 50/457* (2021.01)

(52) U.S. Cl.
  CPC ....... *H01M 50/409* (2021.01); *H01M 50/417* (2021.01); *H01M 50/42* (2021.01); *H01M 50/451* (2021.01); *H01M 50/457* (2021.01); *H01M 50/491* (2021.01)

(56) References Cited

U.S. PATENT DOCUMENTS

| | | |
|---|---|---|
| 2014/0272523 A1 | 9/2014 | Otsuka et al. |
| 2015/0303427 A1 | 10/2015 | Hyun et al. |
| 2016/0190535 A1* | 6/2016 | Fukuchi ............ H01M 50/446 525/299 |
| 2019/0103593 A1 | 4/2019 | Kai et al. |

FOREIGN PATENT DOCUMENTS

| | | |
|---|---|---|
| JP | 201330288 A | 2/2013 |
| JP | 2013211273 A | 10/2013 |
| JP | 2016105398 A | 6/2016 |
| JP | 2017115102 A | 6/2017 |
| KR | 1020090056811 A | 6/2009 |
| KR | 1020120108686 A | 10/2012 |
| KR | 101298340 B1 | 8/2013 |
| KR | 1020150117526 A | 10/2015 |
| KR | 1020150120803 A | 10/2015 |
| KR | 1020160079623 A | 7/2016 |
| KR | 1020170120943 A | 11/2017 |
| WO | 2017169845 A1 | 10/2017 |

* cited by examiner

POROUS COMPOSITE SEPARATOR FOR SECONDARY BATTERY, AND LITHIUM SECONDARY BATTERY COMPRISING SAME

CROSS-REFERENCE TO RELATED APPLICATIONS

This application is the United States national phase of International Application No. PCT/KR2018/015228 filed Dec. 4, 2018, and claims priority to Korean Patent Application No. 10-2017-0167299 filed Dec. 7, 2017, the disclosures of which are hereby incorporated by reference in their entirety.

TECHNICAL FIELD

The present invention relates to a porous composite separator for a secondary battery and a lithium secondary battery including the same.

BACKGROUND ART

In recent years, according to high capacity and high output trends of a secondary battery, there is a growing demand for high strength, high permeability and thermal stability of a separator, and improved characteristics of a separator for electrical safety of a secondary battery during charging and discharging. The lithium secondary battery is required to have high mechanical strength for improving safety in a battery production process and during use of the battery, and to have high air permeability and high thermal stability for improving a capacity and output.

For example, a thermal stability problem is very important in a separator of a secondary battery, and when thermal stability of the separator is lowered, an interelectrode short circuit due to damage or deformation of the separator caused by a temperature rise in the battery may occur, thereby increasing a risk of overheating or fire of the battery. In addition, as an application scope of a secondary battery is extended to a hybrid vehicle and the like, securing the safety of a battery due to overcharge became an important requirement, and the characteristic of a separator to withstand electrical pressure due to overcharge is required.

Regarding these characteristics, the role of a separator to prevent interelectrode short circuit is regarded as being important. Thus, the low thermal shrinkage, the high perforation strength, and the like of a separator are required, and besides, due to development into a high-capacity and high-power battery, excellent air permeability is constantly required.

In order to solve a safety problem of an electrochemical device described above, a separator using an interpenetrating polymer network (IPN) type acryl-based resin as a binder is known in Korean Patent Laid-Open Publication No. 2015-0117526 and the like, that is, a separator having a porous coating layer formed by a mixture of inorganic particles and the IPN polymer binder formed on one surface or both surfaces of a porous polymer substrate, has been suggested. In this case, thermal resistance such as a shrinkage may be secured, but air permeability is lowered, and also, the stability of the battery is still not satisfied.

In addition, a separator using an IPN polymer obtained by copolymerizing a fluorine-based unsaturated monomer and a carboxylic acid-based unsaturated monomer as a binder on the surface of the separator is known in Japanese Patent Laid-Open Publication No. 2013-211273, but the binder does not have sufficient adhesive strength to both porous polyethylene and inorganic particles, needs improvement of air permeability, and still involves a battery capacity degradation problem during charging/discharging.

That is, though a separator for improving the thermal resistance of a separator has been developed, desired levels of stability at high temperature and air permeability are not satisfied at the same time.

DISCLOSURE

Technical Problem

An object of the present invention is to provide a porous composite separator for a secondary battery having excellent thermal resistance by including a particle type polymer binder and an interpenetrating network type binder in a coating layer of the separator.

Another object of the present invention is to provide a porous composite separator for a secondary battery which has excellent air permeability of a separator so that lithium ions of the produced separator move well to significantly improve electrical properties such as a capacity retention rate of a secondary battery, and a method of producing the same.

Still another object of the present invention is to provide a lithium secondary battery including the porous composite separator for a secondary battery.

Technical Solution

In one general aspect, a porous composite separator for a secondary battery includes a porous substrate and a coating layer formed on the porous substrate, wherein the coating layer may be formed by a plurality of inorganic particles which are connected and fixed by a composite binder including a particle type polymer binder and an interpenetrating polymer network (IPN) type binder having no melting point and having a thermal decomposition temperature of 300° C. or higher.

The interpenetrating polymer network type binder may have a crosslinking penetration degree of 20 or less.

The inorganic particles and the particle type polymer binder may have an average particle diameter of 10 nm to 10 μm.

The average particle diameter of the particle type polymer binder may satisfy the following Equations 1 and 2:

$$\frac{R_P}{R_s} \geq 1 \qquad \text{[Equation 1]}$$

$$\frac{R_P}{R_i} \leq 1 \qquad \text{[Equation 2]}$$

wherein $R_s$ is an average pore size of the porous substrate, $R_p$ is an average particle diameter of the particle type polymer binder, and $R_i$ is an average particle diameter of the inorganic particles.

The particle type polymer binder may have a glass transition temperature of 50° C. or higher.

The particle type polymer binder may be included at 0.5 wt % or less, based on a total weight of the coating layer.

The porous composite separator may have a gas permeability of 1 to 700 sec/100 ml.

The coating layer may have a thickness of 1 to 100 μm.

In another general aspect, a lithium secondary battery includes the porous composite separator for a secondary battery according to an embodiment of the present invention.

Advantageous Effects

The porous composite separator for a secondary battery according to an embodiment of the present invention has improved thermal stability, and thus, may prevent ignition or rupture due to an abnormal phenomenon such as a rapid temperature rise.

In addition, the porous composite separator for a secondary battery according to an embodiment of the present invention has excellent air permeability, so that lithium ions move well and the electrical properties such as a charge/discharge capacity, capacity efficiency, and penetration stability of a secondary battery may be significantly improved.

In addition, the porous composite separator for a secondary battery according to an embodiment of the present invention may be introduced for improving thermal stability and electrical properties of a large lithium secondary battery applied to an electric vehicle and the like.

BEST MODE

Figure 1:
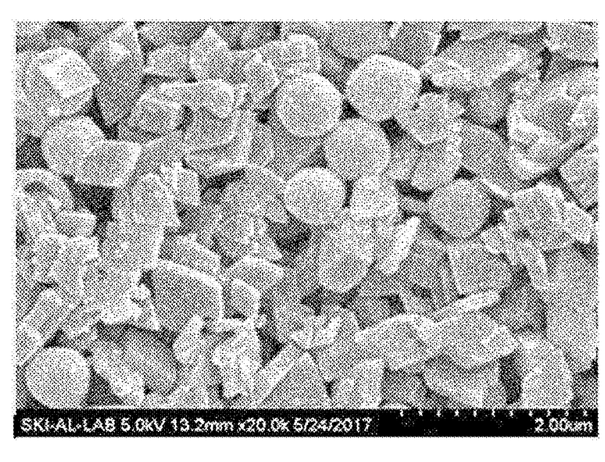
FIG. 1 is a scanning electron micrograph of a surface of a porous composite separator for a secondary battery according to an embodiment of the present invention.

Hereinafter, the present invention will be described in more detail. However, the following exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain exemplary embodiment, and not intended to limit the present invention.

The present invention relates to a porous composite separator for a secondary battery having both improved thermal resistance and air permeability.

Hereinafter, the present invention will be described in more detail.

The porous composite separator for a secondary battery according to an embodiment of the present invention is a separator including a porous substrate and a coating layer formed on the porous substrate, wherein the coating layer may be formed by a plurality of inorganic particles which are connected and fixed by a composite binder including a particle type polymer binder and an interpenetrating polymer network (IPN) type binder having no melting point and having a thermal decomposition temperature of 300° C. or higher.

The porous composite separator for a secondary battery according to the present invention may have high thermal resistance and excellent air permeability.

According to an embodiment of the present invention, the porous composite separator for a secondary battery may include a coating layer including a composite binder including a particle type polymer binder and an interpenetrating polymer network (IPN) type binder having no melting point and having a thermal decomposition temperature of 300° C. or higher. Thus, the porous composite separator may have high thermal resistance and excellent air permeability and have significantly improved thermal stability to prevent ignition or rupture by an abnormal phenomenon such as a rapid temperature rise and prevent interelectrode short circuit, thereby improving battery stability.

The coating layer according to an embodiment of the present invention may include a particle type polymer binder in order to allow lithium ions in the porous substrate to move well and further improve air permeability. The coating layer may be coated on one surface or both surfaces of the porous substrate, or coated on the entire surface of the porous substrate.

The particle type polymer binder has excellent binding strength to an interpenetrating polymer network type binder. Thus, the particle type polymer binder is mixed with the interpenetrating polymer network type binder and included in the coating layer to impart better air permeability and allow lithium ions to move well, thereby decreasing a resistance increase rate to secure battery stability.

An average particle diameter of the particle type polymer binder may be 10 nm to 10 μm as D50 which is a particle diameter corresponding to 50% of a total volume when the particle diameter of each particle type polymer binder is measured and the volume is accumulated from the small particles. Preferably, the average particle diameter may be 100 nm to 2 μm. When the particle type polymer binder has the average particle diameter as described above, it may form a uniform dispersed phase with the interpenetrating polymer network (IPN) type binder, may have excellent air permeability when forming the coating layer, and may prevent pore closure of the porous substrate to prevent rapid movement and overload of lithium ions.

The average particle diameter of the particle type polymer binder may satisfy the following Equations 1 and 2, for preparing the average pore size of the porous substrate and the average particle diameter of the inorganic particles:

$$\frac{R_p}{R_s} \geq 1 \qquad \text{[Equation 1]}$$

$$\frac{R_p}{R_i} \leq 1 \qquad \text{[Equation 2]}$$

wherein $R_s$ is an average pore size of the porous substrate, $R_p$ is an average particle diameter of the particle type polymer binder, and $R_i$ is an average particle diameter of the inorganic particles. Preferably, Equation 1 may be more than 1, and Equation 2 may be less than 1.

When Equations 1 and 2 are satisfied, the pore closure of the porous substrate when the coating layer is formed may be prevented, and the rapid movement and overload of lithium ions may be prevented. In addition, a uniform coating layer may be formed to improve air permeability. In addition, pores between the inorganic particles and the particle type polymer binder and between the porous substrate and the particle type polymer binder are secured, so that lithium ions move well to improve a discharge capacity.

According to an embodiment of the present invention, in order to further improve thermal resistance of the porous composite separator for a secondary battery, the particle type polymer binder may have a glass transition temperature of 50° C. or higher, and preferably 60° C. or higher. Specifically, the glass transition temperature may be 50 to 200° C., and preferably 60 to 200° C. When the particle type polymer binder has the glass transition temperature described above, the porous composite separator may have better air permeability and thermal resistance, and have further improved secondary battery efficiency.

The particle type polymer binder may be included at 0.5 wt % or less, based on the total weight of the coating layer. Preferably, the particle type polymer binder may be included at 0.2 wt % or less. The particle type polymer binder may be included at 0.01 to 0.5 wt %, and preferably 0.01 to 0.2 wt %, based on the total weight of the coating layer. When the particle type polymer binder is included at the content described above, the porous composite separator may secure excellent air permeability and thermal resistance, and prevent rapid movement of lithium ions to improve battery stability.

The particle type polymer binder is not particularly limited, but may be a polymer which may be produced into particles by emulsion or suspension polymerization, and the polymer particles may be used in a slurry form in which the following polymer particles are dispersed in water. As an example of the polymer, a water-dispersible particle binder is more preferred without limitation, and specific examples of the water-dispersible binder include those obtained by dispersing a fluorine-based resin, a polyurethane-based resin, a polycarbonate-based resin, an acryl-based resin, an alkyd-based resin, a polyether-based resin, a melamine-based resins, a cellulose-based resin, and the like in water, which may be used alone or as a mixture or a copolymer of two or more at a specific ratio.

More specifically, the polymer may be a binder obtained by including and dispersing any one or a mixture of two or more selected from polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, an ethylene vinyl acetate copolymer (polyethylene-co-vinyl acetate), polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile-styrene-butadiene copolymer, and polyimide in water.

It is more preferred for achieving the object of the present invention that the polymers have a glass transition temperature of 50° C. or higher, but the glass transition temperature may be lower than the temperature.

More preferably, the interpenetrating polymer network type binder may be a binder of which the melting does not occur up to 300° C. and the thermal decomposition occurs at 300° C. or higher. Specifically, the interpenetrating polymer network type binder may have a thermal decomposition temperature of 300° C. or higher, and preferably 350° C. or higher. Specifically, the thermal decomposition temperature may be 300 to 500° C., and preferably 350 to 500° C. In the case in which the thermal decomposition temperature is lower than 300° C., when melting occurs by a temperature rise, shrinkage of a substrate may not be prevented, so that an edge portion of an electrode is exposed to cause interelectrode short circuit, resulting in heat generation, ignition, explosion, or the like. In addition, as the temperature rises, flexibility of the separator is deteriorated so that it is difficult to maintain the shape, thereby significantly reducing stability.

The interpenetrating polymer network (IPN) type binder according to an embodiment of the present invention has excellent close adhesion with the porous substrate as well as the particle type polymer binder, thereby further improving adhesion of the coating layer and implementing high thermal resistance, and thus, ignition or rupture due to an abnormal phenomenon such as a rapid temperature rise in a secondary battery may be prevented.

In addition, the interpenetrating polymer network type binder has excellent close adhesion between electrodes such as a positive electrode and a negative electrode and a separator as well as close adhesion between the coating layer and the porous substrate to prevent interelectrode short circuit, and thus, battery stability is excellent.

The interpenetrating polymer network type binder may have a crosslinking penetration degree of 20 or less, the crosslinking penetration degree being obtained by measuring a weight gain after the binder is immersed in an electrolyte solution at 60° C. for 72 hours. Specifically, the crosslinking penetration degree may be 0.01 to 20. The crosslinking penetration degree represents a crosslink density of the interpenetrating polymer network type binder, and when the interpenetrating polymer network type binder has the crosslinking penetration degree described above, thermal resistance may be improved and also air permeability may be improved.

The interpenetrating polymer network type binder may be produced by a preparation method described in Korean Patent Laid-Open Publication No. 2016-0079623, but the present invention is not particularly limited thereto. Preferably, the interpenetrating polymer network type binder may be an acryl-based resin. Specifically for example, the acryl-based resin may be an interpenetrating polymer network polymer which includes any one or two or more acryl-based monomers selected from acrylamide, acrylonitrile, N-(isobutoxymethyl)acrylamide, acrylic acid, methacrylic acid, sulfonic acid acrylate, N-phenylmethacrylamide, methylmethacrylamide, ethylacrylate, hydroxytethylacrylate, methylacrylate, ethylacrylate, ethylmethacrylate, and the like and is produced therefrom, but is not particularly limited as long as it is dissolved or swells in water and formed to be transparent.

The composite binder may be included at 0.1 to 40 wt %, and preferably 0.1 to 20 wt %, based on the total weight of the coating layer. When the composite binder is included as described above, thermal resistance may be improved and air permeability may also be excellent to improve battery stability.

The inorganic particles may be any one or two or more inorganic particles selected from alumina, boehmite, aluminum hydroxide, titanium oxide, barium titanium oxide, magnesium oxide, magnesium hydroxide, silica, clay, glass powder, and the like, but are not limited thereto.

The inorganic particles may be included at 60 to 99.9 wt %, and preferably 80 to 99.9 wt %, based on the total weight of the coating layer. When the inorganic particles are included within the range, release of the coating layer from the porous substrate may be prevented, which is thus preferred.

An average particle diameter of the inorganic particles may be 10 nm to 10 μm as D50 which is a particle diameter corresponding to 50% of a total volume when the particle diameter of the inorganic particles is measured and the volume is accumulated from the small particles. Preferably, the average particle diameter may be 100 nm to 1 μm. When the inorganic particles have the average particle diameter, the inorganic particles may be uniformly dispersed and prevent internal electrode short circuit formation during charging/discharging.

The coating layer may have a thickness of 0.1 to 30 μm, and preferably 0.1 to 20 μm. When the coating layer has the thickness, ionic conductivity of separator may be improved to decrease resistance during charging/discharging, thereby improving a secondary battery life and securing stability.

The porous substrate may be used without limitation as long as it is a microporous film adopted in the present technical field, such as a polyolefin-based resin, and furthermore, the porous substrate is not particularly limited as long as it is a porous film which has pores and may be applied to a battery, such as a nonwoven fabric, paper, and those including inorganic particles in the internal pores or on the surface of the microporous film thereof.

The polyolefin-based resin is preferably a polyolefin-based resin alone or in combination, and specifically for example, the polyolefin resin may be any one or a mixture of two or more selected from polyethylene, polypropylene, and a copolymer thereof. In addition, the porous substrate may be produced by using the polyolefin resin alone or using the polyolefin resin as a main component and further including inorganic particles or organic particles. In addition, the porous substrate may be used in a laminated form, and for example, the polyolefin resin may be formed in multiple layers, and for the substrate layer composed of multiple layers also, the case that any one layer or all layers include inorganic particles and organic particles in the polyolefin resin is not excluded.

According to an embodiment of the present invention, the thickness of the porous substrate is not particularly limited, however, may be 5 to 30 μm. As the porous substrate, a porous substrate mainly made of stretching may be adopted, but is not limited thereto.

The porous composite separator for a secondary battery according to an embodiment of the present invention may have a gas permeability of 1 to 700 sec/100 ml, and preferably 1 to 500 sec/100 ml, and more preferably 1 to 300 sec/100 ml, the gas permeability being measured according to a measurement method of JIS P8117. When the porous composite separator has the gas permeability as described above, lithium ions move well, so that electrical properties such as a capacity retention rate of a secondary battery may be significantly improved.

The gas permeability which refers to a time for 100 ml of air to pass for an area of 1 inch$^2$ of a separator (Gurley value), and is a numerical value representing a speed of an electrolyte penetrating a separator, represents a fast rate at which ions in a certain amount of electrolyte penetrate a separator to reach both electrodes, that is, C-Rate (or discharge rate) among battery performance, and is expressed in a unit of sec/100 ml.

The porous composite separator for a secondary battery according to an embodiment of the present invention forms a coating layer including a composite binder composition on a porous substrate, thereby having much improved thermal stability, and allows production of a separator for a lithium secondary battery having much improved capacity properties such as a capacity retention rate of a battery.

The composite binder composition may be formed into a water-based slurry dispersed in water.

The water may include one or a mixture of two or more selected from water such as distilled water and purified water.

Specifically, the composite binder composition may be present as a water-based slurry, the interpenetrating polymer network (IPN) type binder may be present in a state of being dissolved or swelling in water, and the particle type polymer binder may be present in a particle form which is dispersed in water by emulsion or suspension polymerization. Inorganic particles may be introduced to the composite binder composition in which the composite binder is dispersed, dispersed therein, and applied on the coating layer.

When the composite binder composition is applied on a porous substrate to form the coating layer, thermal resistance and air permeability are excellent, and thus, battery stability may be improved.

The composite binder composition may satisfy the following Equation 3, in order to increase dispersion stability and form a uniform coating layer to improve thermal resistance and air permeability:

$$\frac{V_P}{V_{IPN}} \geq 2 \qquad \text{[Equation 3]}$$

wherein $V_p$ is a volume of the particle type polymer binder, and $V_{IPN}$ is a volume of the interpenetrating polymer network (IPN) type binder.

According to an embodiment of the present invention, the composite binder composition may further include a super absorbent polymer. In a three-dimensional network structure or a single chain structure by crosslinks between polymer chains of super absorbent polymer (SAP), an absorption phenomenon of a fluid due to introduction of a hydrophilic group may be shown. When the super absorbent polymer is further included, the electrolyte of the lithium secondary battery may be absorbed, lithium ions may move well, and battery stability may be improved.

The super absorbent polymer is not particularly limited as long as it includes a water-soluble salt. Specific examples thereof include a salt of any one selected from an acryl-based polymer, a vinyl alcohol-based polymer, a vinylpyrrolidone-based polymer, a cellulose-based derivative, an alkylene oxide-based polymer, and polysaccharides, or a copolymer thereof. Specifically for example, the acryl-based polymer may be selected from polyacrylamide, polymethacrylate, polyethylacrylate, polyacrylate, sodium polyacrylate, an acrylic acid-methacrylic acid copolymer, and the like. The vinylalcohol-based polymer may be selected from polyvinylalcohol, polyvinylacetate, a polyvinylacetate-polyvinylalcohol copolymer, and the like. The cellulose derivative may be selected from cellulose, methyl cellulose, ethyl cellulose, carboxymethyl cellulose, hydroxyethyl cellulose, hydroxypropyl methylcellulose, cellulose acetate, and cellulose acetate propionate, and the like. The vinylpyrrolidone polymer may be selected from copolymers including polyvinylpyrrolidone and vinylpyrrolidone. The alkyleneoxide-based polymer may be selected from polyethyleneoxide, polyethylene propylene glycol, polyethylene glycol diacrylate, polyethylene glycol dimethylether, polypropyleneoxide, and the like. The polysaccharides may be any one or a mixture of two or more selected from alginate, starch, xanthan gum, gellan gum, gelatin, chitosan, hyaluronic acid, dextran, chitosan, and the like, but are not limited thereto. Here, the salt may be an alkali metal salt, and a lithium salt for increasing the stability of a lithium secondary battery.

Another embodiment of the present invention is a method of producing a porous composite separator for a secondary battery, and the method will be described in detail in the following.

The method of producing a porous composite separator for a secondary battery according to an embodiment of the present invention may include a) applying a water-based slurry including inorganic particles and a composite binder composition on a porous substrate; and b) after the applying step, performing heat drying to form a coating layer.

By the production method, a porous composite separator for a secondary battery which has much improved thermal stability and much improved capacity properties such as a battery capacity retention rate, may be produced on the porous substrate. This may be supported by the Examples as described below.

Step a) of applying a water-based slurry including inorganic particles, a composite binder, and water is a step of applying a water-based slurry for forming a coating layer having thermal stability and electrical properties on the porous substrate. The kinds of porous substrate, inorganic particles, and binder are as described above, and thus, descriptions thereof will be omitted.

Specifically, the composite binder composition may be present as a water-based slurry, the interpenetrating polymer network (IPN) type binder may be present in a state of being dissolved or swelling in water, and the particle type polymer binder may be present in a particle form which is dispersed in water by emulsion or suspension polymerization. Inorganic particles may be introduced to the composite binder composition in which the composite binder is dispersed, dispersed therein, and applied on the coating layer.

The coating layer is formed by including the inorganic particles and the composite binder composition, whereby surprisingly, the porous composite separator for a secondary battery may have improved thermal resistance such as a heat shrinkage. In addition, air permeability is excellent so that lithium ions move well due to pore closure, and thus, when pressure is applied, pores may be maintained stably.

Step b) is a step of applying the water-based slurry and then drying by heat, and a drying temperature may be 40 to 100° C. When the drying is performed, the coating layer is uniformly dried while the physical properties of the porous substrate are not influenced, thereby preventing poor coating. The drying step is a step of deriving drying of water in the water-based slurry applied on the porous substrate and binding of the inorganic particles and the composite binder to finally form the coating layer.

An embodiment of the present invention may provide a lithium secondary battery including the porous composite separator for a secondary battery described above. The lithium secondary battery may be produced by including the porous composite separator for a secondary battery according to an embodiment of the present invention, a positive electrode, a negative electrode, and a nonaqueous electrolyte solution.

An embodiment of the present invention provides a lithium secondary battery including the porous composite separator for a secondary battery described above. The lithium secondary battery may be produced by including the composite separator for a secondary battery according to an embodiment of the present invention, a positive electrode, a negative electrode, and a nonaqueous electrolyte.

As described above, though the exemplary embodiments of the present invention have been described in detail, a person skilled in the art may make various variations of the present invention without departing from the spirit and the scope of the present invention, as defined in the claims which follow. Accordingly, any modification of the following Examples of the present invention may not depart from the technique of the present invention.

[Method of Measuring Physical Properties]
1. Crosslinking Penetration Degree

An interpenetrating polymer network type binder was immersed in an electrolyte solution at 60° C. for 72 hours, and then a weight gain was measured.

The electrolyte solution was a mixture of ethylene carbonate (EC), ethyl methyl carbonate (EMC), and diethyl carbonate (DEC) at a weight ratio of 3:1:6.

The crosslinking penetration degree was calculated by the following equation:

$$\text{Crosslinking penetration degree} = \frac{\text{Weight gain (g) of electrolyte solution-absorbing } IPN \text{ type binder}}{\text{Weight (g) of } IPN \text{ type binder}} \times 100$$

2. Thermal Resistance

Separators according to the Examples and the Comparative Examples were cut into a size of TD×MD=100 mm×100 mm, and marked at intervals of 20 mm in the transverse direction (TD)/machine direction (MD) using a caliper (nonius). The separators were inserted between Teflon sheets, and maintained in a thermostat at 150° C. for 60 minutes. Then, the separators were taken out, each mark interval in TD/MD was read with a caliper, and the heat shrinkage was calculated by the following equation. The obtained heat shrinkage evaluation results are shown in the following Table 1.

$$\text{Heat shrinkage (\%)} = ((20 - \text{interval after heating})/20) \times 100$$

3. Film Retention Strength

The separators according to the Examples and the Comparative Examples were cut into a size of 50 mm×50 mm, inserted between cellulose films, and maintained in a thermostat at 250° C. for 5 minutes. Then, the cellulose films and the separators were taken out, and then maintained at room temperature for 10 minutes or more. The separators reaching room temperature were taken and it was measured whether the area which was deteriorated and lost or shrunk at a high temperature was within 10%.

4. Electrochemical Measurement of Battery

The batteries produced according to the Examples and the Comparative Examples were charged at a constant current-constant voltage (CC-CV) of 4.2 V, using a charge/discharge cycle instrument, and then discharged to 2.7 V (controlled rate 1C1C). Each of formation charge capacity, shipment discharge capacity, initial efficiency, and AR-IR therefrom was measured.

5. Battery Penetration Evaluation

In order to measure battery safety, each battery produced was fully charged to the state of charge (SOC) of 100%, and nail penetration evaluation was performed. Here, the diameter of the nail was 3.0 mm, and all penetration speeds of the nail were fixed at 80 mm/min. L1: no change, L2: slightly heated, L3: leaked, L4: fumed, and L5: ignited, in which L1 to L3 were judged as Pass, and L4 and L5 were judged as Fail.

6. Thermal Property Measurement

A thermal decomposition temperature was measured by heating from room temperature to 900° C. at a heating rate of 10° C./min under a nitrogen atmosphere using TGA equipment available from TA (product name: Q500). Here, measurement was performed under an Air atmosphere at a temperature of 700° C. or higher.

A thermal decomposition temperature and a melting point were measured by heating from at −50° C. to 300° C. at a heating rate of 20° C./min under a nitrogen atmosphere using DSC equipment available from TA (product name:

Q200). Here, the measurement was performed by heating twice (1st, 2nd run, and cooling).

7. Gas Permeability Measurement

The gas permeability of the separator was compared by recording a time for 100 ml of air to pass a separator having an area of 1 inch$^2$ in seconds, according to the standard of JIS P8117.

8. Viscosity Measurement

The viscosity was measured using a Brookfield viscometer (Dv2TRV-cone&plate, CPA-52Z) at 25° C.

Example 1

A particle type polymer binder solution in which 12 parts by weight of the acryl-based particle type polymer binder (BM900B, $T_g$: −52° C., an average particle diameter of 380 nm, a solid content of 20 wt %) was dispersed in 100 parts by weight of water and an IPN type binder solution in which 20 parts by weight of an acryl-based IPN type binder ($T_d$: 370° C., crosslinking penetration degree: 16.8, a solid content of 15 wt %, a viscosity of 1,000 cps) was dispersed in 100 parts by weight of water were mixed and dispersed to produce a composite binder composition. Thereafter, 100 parts by weight of boehmite having an average particle diameter of 500 nm (γ-AlO(OH)) (Nabaltec, Apyral AOH60) was added with respect to 100 parts by weight of the composite binder composition and stirring was performed to produce a uniform water-based slurry.

As a porous substrate, a polyolefin microporous product having a thickness of 9 μm (SK Innovation, ENPASS, average pore size: 45 nm) was used, and the water-based slurry was coated on both surfaces of the substrate at a speed of 10 μm/min using a slot coating die, and then dried and wound.

The thickness of the double-sided coating layer measured after drying was 3 μm, respectively.

Example 2

The process was performed in the same manner as in Example 1, except that an acryl-based particle type polymer binder having a glass transition temperature ($T_g$) of 62° C. (an average particle diameter of 790 nm, a solid content of 25 wt %, and a viscosity of 10 cps) was used.

Example 3

The process was performed in the same manner as in Example 1, except that an acryl-based IPN type binder having a thermal decomposition temperature ($T_d$) of 380° C. and a crosslinking penetration degree of 10.7 was used.

Example 4

The process was performed in the same manner as in Example 1, except that an acryl-based IPN type binder having a thermal decomposition temperature ($T_d$) of 370° C. and a crosslinking penetration degree of 8 was used.

Example 5

The process was performed in the same manner as in Example 1, except that an acryl-based IPN type binder having a thermal decomposition temperature ($T_d$) of 350° C. and a crosslinking penetration degree of 20 was used.

Example 6

The process was performed in the same manner as in Example 1, except that an acryl-based IPN type binder having a thermal decomposition temperature ($T_d$) of 360° C. and a crosslinking penetration degree of 2 was used.

Example 7

The process was performed in the same manner as in Example 1, except that an acryl-based IPN type binder having a thermal decomposition temperature ($T_d$) of 350° C. and a crosslinking penetration degree of 21 was used.

Example 8

The process was performed in the same manner as in Example 1, except that an acryl-based IPN type binder having a thermal decomposition temperature ($T_d$) of 340° C. and a crosslinking penetration degree of 12.3 was used.

Comparative Example 1

The process was performed in the same manner as in Example 1, except that the acryl-based particle type polymer binder was not used.

Comparative Example 2

The process was performed in the same manner as in Example 1, except that the acryl-based IPN type binder was not used.

Comparative Example 3

The process was performed in the same manner as in Example 1, except that an acryl-based IPN binder having a melting point of 250° C. was used.

Comparative Example 4

In Comparative Example 4, an inorganic coating separator (ceramic coating separator) ENPASS which is currently commercially available from SK innovation was applied and comparison was made for each evaluation item.

In the present invention, battery characteristics were compared based on the results of Comparative Example 4.

The results of evaluating the separator characteristics of Examples 1 to 8 and Comparative Examples 1 to 4 are shown in Table 1.

TABLE 1

| Item<br>Unit | Thickness of composite separator<br>μm | Gas permeability<br>sec/100 cc | Tensile strength<br>Kgf/cm$^2$ | Heat shrinkage (150° C.)<br>% | Film shape maintenance<br>(@300° C.) |
|---|---|---|---|---|---|
| Example 1 | 15 | 253 | 1102 | 0.4 | OK |
| Example 2 | 15.2 | 193 | 1085 | 0.2 | OK |
| Example 3 | 15.1 | 231 | 998 | 0.3 | OK |
| Example 4 | 15 | 236 | 1035 | 0.4 | OK |
| Example 5 | 15.2 | 248 | 1085 | 0.7 | OK |
| Example 6 | 14.9 | 236 | 1135 | 0.8 | OK |
| Example 7 | 14.9 | 260 | 1015 | 1.1 | OK |
| Example 8 | 15.2 | 272 | 1068 | 2.1 | OK |
| Comparative Example 1 | 15.1 | 830 | 1058 | 0.4 | OK |
| Comparative Example 2 | 15.2 | 158 | 1045 | 32.0 | NG |

TABLE 1-continued

| Item<br>Unit | Thickness of composite separator<br>μm | Gas permeability sec/100 cc | Tensile strength<br>Kgf/cm² | Heat shrinkage (150° C.)<br>% | Film shape maintenance (@300° C.) |
|---|---|---|---|---|---|
| Comparative Example 3 | 15 | 242 | 995 | 26.0 | NG |
| Comparative Example 4 | 15 | 195 | 1023 | 8.3 | NG |

As shown in Table 1, it was confirmed that the porous composite separators according to the present invention had lower heat shrinkage as compared with the separators of the Comparative Examples and showed excellent thermal resistance, and had excellent air permeability.

Furthermore, it was confirmed from the Examples that when the interpenetrating polymer network type binder had a thermal decomposition temperature of 350° C. or higher and a crosslinking penetration degree of 20 or less, the binder had more improved thermal resistance and may implement excellent gas permeability.

In addition, it was confirmed from Comparative Example 1 that when the particle type binder was not used, pores of the porous substrate were blocked so that a gas permeability decrease occurred due to pore closure.

In addition, it was confirmed from Comparative Examples 2 and 3 that when the interpenetrating polymer network type binder was not used or an interpenetrating polymer network type binder having a melting point of 300° C. or lower was used, the heat shrinkage was high or the film shape was not retained at room temperature.

Therefore, upon comparison of the Examples and the Comparative Examples, it was confirmed that when the thermal decomposition temperature is 300° C. or higher, and preferably 350° C. or higher, the heat shrinkage is further improved.

In addition, it was confirmed that when the particle type polymer binder had a glass transition temperature of 50° C. or higher, air permeability and thermal resistance were better.

[Electrochemical Properties of Battery]

(1) Production of Positive Electrode 94 wt % of $LiCoO_2$ as a positive active material, 2.5 wt % of polyvinylidene fluoride as an adhesive, and 3.5 wt % of carbon black as a conductive agent were added to N-methyl-2-pyrrolidone (NMP) as a solvent, and stirring was performed to produce a uniform positive electrode slurry. The slurry was coated on an aluminum foil having a thickness of 30 μm, dried at a temperature of 120° C., and pressed to produce a positive electrode plate having a thickness of 150 μm.

(2) Production of Negative Electrode 95 wt % of artificial graphite as a negative electrode active material, 3 wt % of acrylic latex having $T_g$ of −52° C. (Product name: BM900B, solid content: 20 wt %), and 2 wt % of carboxymethyl cellulose (CMC) as a thickener were added to water as a solvent, and stirring was performed to produce a uniform negative electrode slurry. The slurry was coated on copper foil having a thickness of 20 μm, dried at a temperature of 120° C., and pressed to produce a negative electrode plate having a thickness of 150 μm.

(3) Production of Battery

The positive electrode and the negative electrode produced above, and the separators produced in Example 1 were used to assemble a pouch type battery in a stacking manner, and to each assembled battery, an electrolyte solution in which 1M lithium hexafluorophosphate ($LiPF_6$) was dissolved in ethylene carbonate (EC)/ethyl methyl carbonate (EMC)/dimethyl carbonate (DMC)=3:5:2 (volume ratio) was injected to produce a lithium secondary battery, having a capacity of 17 Ah.

The results of evaluating the lithium secondary batteries of the Examples and the Comparative Examples are shown in Table 2, and the results of evaluating penetration of the lithium secondary battery of the Examples and the Comparative Examples, performed according to a penetration test evaluation method are shown in Table 3.

TABLE 2

| Item<br>Unit | Charge capacity<br>mAh | Discharge capacity<br>mAh | Capacity efficiency<br>% | AC-IR<br>mΩ |
|---|---|---|---|---|
| Example 1 | 17020 | 15222 | 92.5 | 1.50 |
| Example 2 | 17010 | 15564 | 93.2 | 1.49 |
| Example 3 | 17060 | 15490 | 92.8 | 1.53 |
| Example 4 | 17000 | 15370 | 92.4 | 1.51 |
| Example 5 | 16910 | 15420 | 92.2 | 1.49 |
| Example 6 | 16930 | 15370 | 91.8 | 1.54 |
| Example 7 | 16930 | 15270 | 90.2 | 1.55 |
| Example 8 | 17020 | 15454 | 90.8 | 1.54 |
| Comparative Example 1 | 17050 | 13860 | 81.3 | 1.74 |
| Comparative Example 2 | 16950 | 15340 | 90.5 | 1.50 |
| Comparative Example 3 | 17000 | 15250 | 89.7 | 1.53 |
| Comparative Example 4 | 16970 | 15460 | 91.1 | 1.52 |

As shown in Table 2, it was confirmed that the secondary battery including the porous composite separator according to the present invention had significantly improved electrochemical properties of a battery as compared with Comparative Example 6 which is currently used and significantly increased battery stability such as battery life and discharge capacity ratio.

Furthermore, it was found that Comparative Example 1 in which the particle type binder was not used had deteriorated gas permeability and showed inferiority in terms of capacity efficiency.

TABLE 3

|  | SOC 100% | SOC 90% | SOC 80% | SOC 70% | SOC 60% |
|---|---|---|---|---|---|
| Example 1 | L3 | L2 | L2 | L2 | L2 |
| Example 2 | L3 | L2 | L2 | L2 | L2 |
| Example 3 | L3 | L3 | L2 | L2 | L2 |
| Example 4 | L3 | L3 | L2 | L2 | L2 |
| Example 5 | L3 | L3 | L2 | L2 | L2 |
| Example 6 | L3 | L3 | L2 | L2 | L2 |
| Example 7 | L5 | L3 | L3 | L3 | L3 |
| Example 8 | L5 | L3 | L3 | L2 | L2 |
| Comparative Example 1 | L5 | L4 | L3 | L3 | L2 |
| Comparative Example 2 | L5 | L5 | L5 | L3 | L3 |
| Comparative Example 3 | L5 | L4 | L3 | L3 | L2 |
| Comparative Example 4 | L5 | L5 | L3 | L3 | L3 |

As shown in Table 3, it was found that the secondary battery including the porous composite separator according to the present invention secured penetration safety of SOC up to 100%.

However, in the Comparative Examples, penetration safety was not sufficiently satisfied, and this seems to be due to the fact that at the time of nail penetration, shrinkage or breakage of sheets becomes severe due to heating around the nail to cause internal short circuit, leading to diffusion to secondary heating, so that the safety was not secured.

In particular, when the interpenetrating polymer network type binder having a melting point or the interpenetrating polymer network type binder having a thermal decomposition temperature of 350° C. or lower was used, the battery failed the penetration evaluation at SOC 100%, which seems to be due to the fact that the coating layer was melted or decomposed by heat generated at the time of nail penetration to cause internal short circuit.

In addition, when the crosslinking penetration degree was 20 or more, it is assumed that a network between chains was not sufficiently formed, so that sufficient heat resistance was not secured.

In addition, it was confirmed that the composite separator including the particle type polymer binder having a glass transition temperature of 50° C. or higher had excellent air permeability and thermal resistance, and excellent capacity efficiency of a secondary battery.

Accordingly, the composite separator for a secondary porous battery of the present invention has excellent thermal stability and battery stability, and also has excellent electrical properties such as a capacity retention rate, and thus, when the separator is applied to a lithium secondary battery, significantly excellent properties may be represented.

Hereinabove, although the porous composite separator for a secondary battery and the lithium secondary battery including the same have been described in the present invention by specific matters and limited exemplary embodiments, the exemplary embodiments have been provided only for assisting in the entire understanding of the present invention, and the present invention is not limited to the above exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

The invention claimed is:

1. A porous composite separator for a secondary battery comprising: a porous substrate and a coating layer formed on the porous substrate,
   wherein the coating layer is formed by a plurality of inorganic particles which are connected and fixed by a composite binder including a particle type polymer binder and an interpenetrating polymer network (IPN) type binder having no melting point and having a thermal decomposition temperature of 300° C. or higher and having a crosslinking penetration degree of 20 or less,
   wherein the particle type polymer binder has an average particle diameter of more than 100 nm and 10 μm or less, and
   wherein the average particle diameter of the particle type polymer binder satisfies the following Equation 1:

$$\frac{R_p}{R_s} > 1 \qquad \text{[Equation 1]}$$

wherein
$R_s$ is the average pore size of the porous substrate, and $R_p$ is the average particle diameter of the particle type polymer binder.

2. The porous composite separator for a secondary battery of claim 1, wherein the inorganic particles have an average particle diameter of 10 nm to 10 μm. interpenetrating polymer network type binder has a crosslinking penetration degree of 20 or less.

3. The porous composite separator for a secondary battery of claim 2, wherein the average particle diameter of the particle type polymer binder satisfies the following Equation 2:

$$\frac{R_p}{R_i} \leq 1 \qquad \text{[Equation 2]}$$

wherein
$R_p$ is the average particle diameter of the particle type polymer binder, and $R_i$ is the average particle diameter of the inorganic particles.

4. The porous composite separator for a secondary battery of claim 1, wherein the particle type polymer binder has a glass transition temperature of 160° C. or higher.

5. The porous composite separator for a secondary battery of claim 1, wherein the particle type polymer binder is included at 0.5 wt % or less with respect to a total weight of the coating layer.

6. The porous composite separator for a secondary battery of claim 1, wherein the porous composite separator has a gas permeability of 1 to 700 sec/100 ml.

7. The porous composite separator for a secondary battery of claim 1, wherein the coating layer has a thickness of 1 to 100 μm.

8. A lithium secondary battery comprising the porous composite separator for a secondary battery of claim 1.

9. A lithium secondary battery comprising the porous composite separator for a secondary battery of claim 2.

10. A lithium secondary battery comprising the porous composite separator for a secondary battery of claim 3.

11. A lithium secondary battery comprising the porous composite separator for a secondary battery of claim 4.

12. A lithium secondary battery comprising the porous composite separator for a secondary battery of claim 5.

13. A lithium secondary battery comprising the porous composite separator for a secondary battery of claim 6.

14. A lithium secondary battery comprising the porous composite separator for a secondary battery of claim 7.

15. The porous composite separator for a secondary battery of claim 1, wherein the particle type polymer binder has an average particle diameter of 380 nm or more and 10 μm or less.

* * * * *

UNITED STATES PATENT AND TRADEMARK OFFICE
CERTIFICATE OF CORRECTION

PATENT NO. : 11,843,125 B2
APPLICATION NO. : 16/769707
DATED : December 12, 2023
INVENTOR(S) : Hye Jin Kim et al.

It is certified that error appears in the above-identified patent and that said Letters Patent is hereby corrected as shown below:

In the Claims

Column 15, Line 54, Claim 1, delete "point and" and insert -- point, --

Column 16, Lines 14-16, Claim 2, after "µm." delete "interpenetrating polymer network type binder has a crosslinking penetration degree of 20 or less."

Signed and Sealed this
Sixth Day of February, 2024

Katherine Kelly Vidal
*Director of the United States Patent and Trademark Office*